(12) United States Patent
Bann et al.

(10) Patent No.: US 9,535,570 B2
(45) Date of Patent: Jan. 3, 2017

(54) METHOD AND SYSTEM FOR REMOTE ALARM EVENT NOTIFICATIONS FOR AUTOMATED MACHINERY

(71) Applicant: Specter Instruments, Inc., Austin, TX (US)

(72) Inventors: Cody Bann, Round Rock, TX (US); William Wayne, Round Rock, TX (US); Steven Szabo, Austin, TX (US); Jeffrey Moeller, Austin, TX (US)

(73) Assignee: WIN—911 Software, Austin, TX (US)

( * ) Notice: Subject to any disclaimer, the term of this patent is extended or adjusted under 35 U.S.C. 154(b) by 395 days.

(21) Appl. No.: 14/185,858

(22) Filed: Feb. 20, 2014

(65) Prior Publication Data

US 2014/0282193 A1 Sep. 18, 2014

Related U.S. Application Data

(60) Provisional application No. 61/788,919, filed on Mar. 15, 2013.

(51) Int. Cl.

| | |
|---|---|
| G06F 3/0481 | (2013.01) |
| G06F 9/44 | (2006.01) |
| G06F 3/0486 | (2013.01) |
| G05B 19/406 | (2006.01) |
| G05B 19/409 | (2006.01) |

(52) U.S. Cl.
CPC ......... *G06F 3/04817* (2013.01); *G05B 19/406* (2013.01); *G05B 19/409* (2013.01); *G06F 3/0486* (2013.01); *G06F 8/34* (2013.01)

(58) Field of Classification Search
CPC ... G06F 11/273; G06F 3/04817; G06F 9/5083
See application file for complete search history.

(56) References Cited

U.S. PATENT DOCUMENTS

| | | | | |
|---|---|---|---|---|
| 6,445,774 | B1 * | 9/2002 | Kidder | H04M 3/10 379/14.01 |
| 7,043,661 | B2 * | 5/2006 | Valadarsky | H04L 41/0604 379/15.05 |
| 7,065,493 | B1 * | 6/2006 | Homsi | G06Q 10/06 705/7.26 |
| 2003/0204209 | A1 * | 10/2003 | Burnes | A61N 1/3962 607/14 |
| 2004/0128093 | A1 * | 7/2004 | Cragun | G06Q 10/109 702/79 |
| 2006/0005158 | A1 * | 1/2006 | Pike | G06Q 10/06 717/105 |
| 2008/0208812 | A1 * | 8/2008 | Quoc | G06Q 10/10 |

* cited by examiner

*Primary Examiner* — William Bashore
*Assistant Examiner* — Rayeez Chowdhury
(74) *Attorney, Agent, or Firm* — Barry N. Young

(57) ABSTRACT

A tactic for notifications of an alarm event occurring in automated machinery and systems is created by constructing a diagrammatic representation of a logical workflow of processing operations by dragging and dropping icons representing instructions for controlling processing operations on to a workspace of a GUI, and converting the diagrammatic representation into a sequence of executable instructions for controlling a computer system to process alarm event notifications in accordance with the logical workflow.

19 Claims, 9 Drawing Sheets

Figure 6

METHOD AND SYSTEM FOR REMOTE ALARM EVENT NOTIFICATIONS FOR AUTOMATED MACHINERY

BACKGROUND

Automated machinery is used in a variety of industries, such as manufacturing, water treatment, energy production and distribution, and other settings. The chief advantage of automated machinery is that the amount of oversight, labor, and expertise is reduced, as compared with machinery that is not automated. Automated machineries are typically controlled by low level standalone processors (such as PLCs) running operating systems like Ladder Logic, which open and close circuits in order to manipulate machinery. Labor requirements are further reduced when the low level standalone processors are integrated into a high level network which synergistically gathers and distributes data from all automated machinery via a software platform capable of large scale control. Such a platform can conduct tasks like archiving historical trends, monitoring operating conditions, and evaluate alarm events. Monitoring programs and related hardware control devices integrated with the automated machinery are often referred to in the industry as Supervisory Control and Data Acquisition (SCADA) systems.

The SCADA industry developed the concept of alarm events that are designed to monitor operating conditions and alert the appropriate responders to "out-of-tolerance" conditions in order for corrective action to take place. These alarm events initially consisted of data values like "On" or "Off" or a numeric limit that a value was not to exceed. When the responder is made aware of the alarm event he or she would acknowledge the alarm, marking it as a condition whose responsibility for resolution has been accepted. Over the years the alarm event concept has been significantly enhanced to include a vast range of attributes like priority, elapsed time, severity, etc., resulting in an unlimited range of ways to process such events.

Situations arise where appropriate responders to alarm events are not easily located, especially in plants that are not manned on a 24-hour basis. In such an instance a plant may have to cease production at the close of business unless there is a mechanism in place capable of alerting key personnel about operationally critical issues that require a response. Hence, the development of a class of products whose sole purpose is to notify appropriate personnel regardless of their physical proximity to an event. It is critical for the notification product to "find" the appropriate person wherever he or she is located, to have a backup notification plan in case the first person is not available to respond, and to provide essential requisite data necessary to resolve the alarm event. Such software is referred to as "remote alarm notification software."

Known remote alarm notification software products allow designation of personnel to be notified in a sequential fashion (i.e., if person A does not respond to the alarm, notify person B). However, these alarm notification products typically have predetermined alarm strategies and their underlying logic pre-coded and embedded into the product, and lists of personnel to be notified in response to alarms listed in sequential order in a table. Changing the logic of the strategies or the ordered listing of personnel typically requires cryptic line-by-line changes to the embedded coding. This results in a long development and deployment cycle as well as intensive maintenance during the lifetime of the product. Once deployed, making modifications to the table is resource and time intensive, and incurs significant risk due to the mission-critical nature of the application. Moreover, complex systems may require a variety of different strategies and tactics to handle different types of events, and these may have to be changed frequently. Creating multiple strategies and tactics and changing them once created are also very resource and time intensive tasks that are not easily done.

What is needed is an improved system and method that address these and other problems of known products and methods by providing more flexible workspace environment systems and methods that allow a user to create, develop, configure and test complex notification strategies and tactics workflow processes quickly and easily, that afford escalation rules that are flexible and enable the workflows to be easily altered to accommodate changing circumstances, and that afford a user interface and underlying logic that makes the system and method easy to learn and use. It is to these ends that the invention is directed.

SUMMARY OF THE INVENTION

The invention provides systems, products and methods that address the foregoing and other problems with current alarm notification products and methods by providing alarm event systems and methods that are flexible, easily developed and that are capable of adapting to and monitoring complex systems. In order to reduce the development, testing and deployment efforts normally involved in rendering complex alarm notification rules into code that an alarm system can execute, the invention affords a novel flow chart style graphical user interface (GUI) that facilitates creation and editing of notification strategies and tactics. Appropriate strategies and tactics are triggered in response to events such as different alarm states occurring on the underlying machinery or system being monitored. An alarm state may comprise, for example, an alarm that is new, an alarm that has recurred within a defined amount of time, an alarm that has gone unacknowledged for a defined amount of time, an alarm that has been acknowledged, etc. A system and method in accordance with the invention creates and invokes a predetermined set of appropriate process instructions (referred to herein as tactic workflows) based on the type of alarm event. Each tactic workflow may contain multiple sets of instructions, and may even contain other tactics (which are referred to as sub-tactics). The system and method of assembling and testing remote alarm notifications and escalation scenarios afforded by the invention are easier for users to build, understand, visualize, and modify than known products that require users to build each instruction in a granular fashion.

In an aspect, the invention provides a graphical user interface displaying a workspace, onto which a plurality of instruction block icons representing different instructions for controlling different processing operations of a computer system are positioned to construct a diagrammatic representation of a logical workflow of operations for processing notifications. The diagrammatic representation is converted into a sequence of computer executable instructions for enabling said different processing operations in accordance with the logical workflow.

BRIEF DESCRIPTION OF THE DRAWINGS

The invention will be described by reference will be made to the accompanying drawings, in which:

FIG. 6 is a screen shot illustrating the concept of roles in accordance with the invention;

DETAILED DESCRIPTION OF PREFERRED EMBODIMENTS

Figure 1:
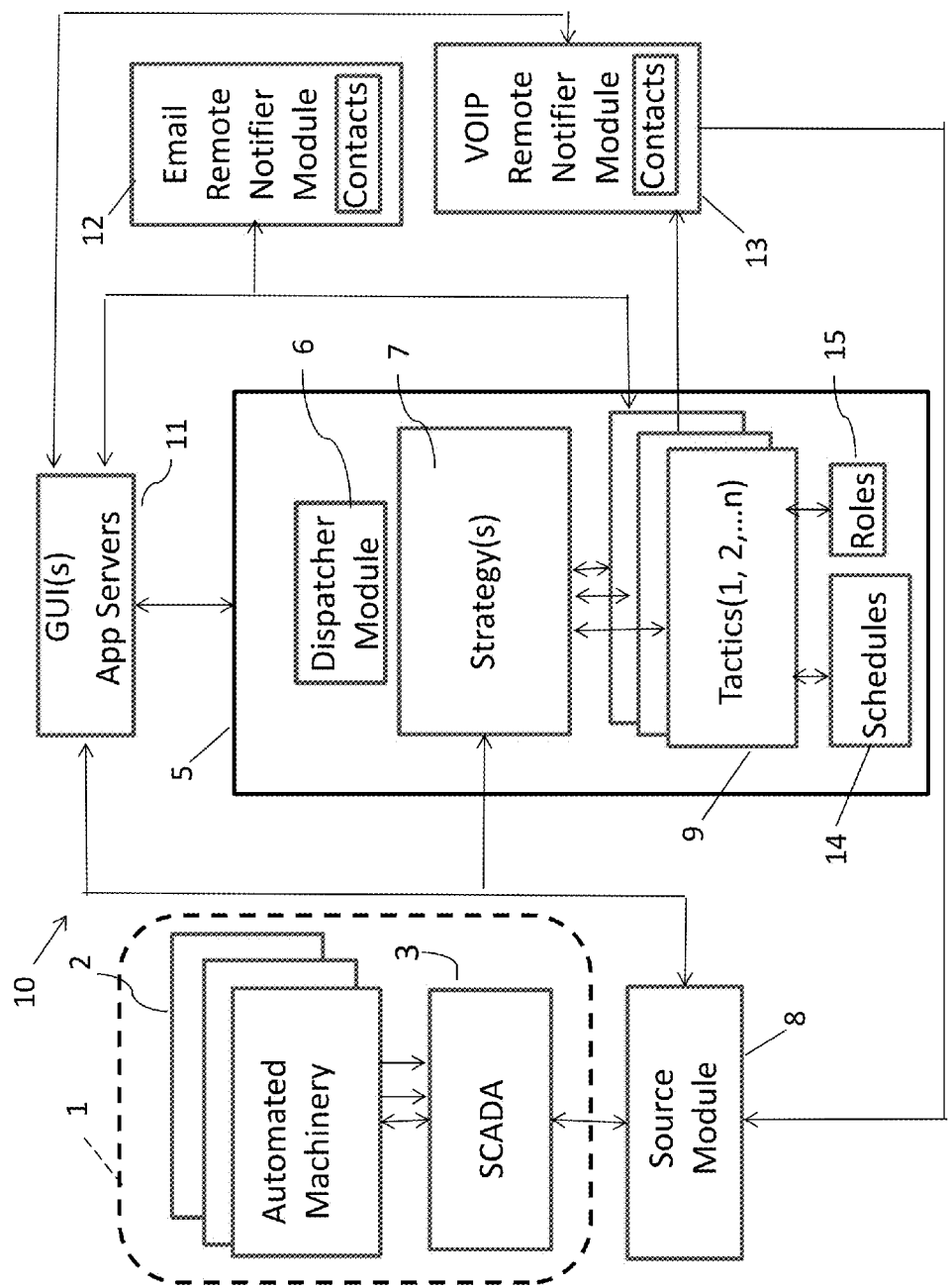
FIG. 1 is a diagrammatic block view of an alarm notification system in accordance with the invention shown in a typical environment in which it is used.

FIG. 1 is a conceptual block diagram of a monitoring system 10 in accordance with an embodiment of the invention shown in a typical monitoring environment. The typical environment may be a plant, factory or other processing arrangements 1 controlled by automated machinery 2 embodying programmable logic controllers (PLCs), microprocessors, or the like, having their own operating systems and logic. Such machinery will typically be integrated into and interface with a SCADA system 3 that will likewise interface with a computer system 5 of the invention. The automated machinery may upload its data to the SCADA system which may centralize (store in a data store) that data in a well known manner and make it available to other applications and services running within the operating systems. The invention may comprise user-defined modules configured to receive data from the SCADA system and invoke strategies and associated tactics that respond to alarm events and conduct remote notification procedures of personnel. System 10 may comprise a computer system 5 embodying a dispatcher module 6 and a variety of strategy processes 7 for handling different alarm events. Based upon a received alarm event, as from a source module 8, each strategy may comprise and invoke any of a number of user-defined tactics 9. Tactics may receive as input parameters conditions such as schedules 14 and roles 15 of personnel. As will be described, each tactic may comprise a logical series of tasks (processes) that form a workflow for handling alarm event processing and messaging based on predetermined conditions and user-defined input. As will also be described, the tasks may be configured into tactics workflows by utilizing a graphical user interfaces (GUIs) and associated application servers 11 and sets of selectable instructions that are subdivided into notifications, decisions and miscellaneous instructions. A tactic can comprise and invoke other tactics, which are called sub-tactics. When a tactics workflow completes or an alarm event terminates, the tactics and strategies end. Unlike known alarm monitoring products that require tedious and time-consuming entry of instructions, as will be described a system and method in accordance with the invention enables creation, testing and modification of workflows quickly and easily.

The architecture of the system and method of the invention may be centralized or distributed among processing modules that seamlessly interact with each other and can be deployed on a single computing node or dispersed across several nodes on the SCADA system network. Each module may comprise primary components which include an application server and GUI 11 that may run within, e.g., Microsoft's Internet Information Services (IIS). This conveniently allows the system to be programmed and monitored through internal password protected URLs that can be accessed by various computers in the system network. A third component may be a runtime executable that runs in the operating systems' services on the computer system. The modules may comprise a dispatcher module 6, a source module 8, an email service module 12 and a VOIP service module 13, which are described below.

The computer system 5 and dispatcher module 6 may be the primary components of the infrastructure of a system in accordance with the invention. The computer system may comprise one or more CPUs, memory comprising physical non-transitory computer readable media embodying instructions for controlling the operations of the CPUs, and a master runtime configuration database (data store) storing, among other things, the strategies and tactics, (components which are not shown explicitly in the drawing). The computer system may execute and control all strategies and tactics, and receive and implement programming from a GUI whenever a strategy, a tactic, or a role is modified. The computer system 5 may also receive alarm event data from the source module 8, and provide remote notification instructions to one or more notifier modules, such as email remote notifier module 12 and VOIP remote notifier module 13. Each module may store contacts information, as shown.

The source module 8 may communicate directly with the SCADA system 3, receive alarm event data from the automated machinery 2 or system being monitored, and distribute the data to the computer system 5 and the GUIs 11. It receives and implements programming from the GUIs whenever a change or edit is saved, and may work in conjunction with the GUIs to conduct alarm database imports. The module may subscribe to alarm services provided by the SCADA system and validate the data's integrity and security. It also may receive alarm acknowledgement messages from the notifier modules which it delivers to the SCADA system and receive acknowledgement confirmation messages which it routes to the controlling strategy process.

The email notifier module 12 may receive remote notification tasking from tactics 9 running in the computer system 5, subscribe as a client to a configured email server (not shown), and contain the email contacts and gateway data entered from the GUIs. It receives and implements programming from the GUIs. It utilizes the configured protocol to deliver email alarm messages and receives email responses from a contact's responder with alarm acknowledgement messages which it may relay to the source module for processing in the SCADA system.

The VOIP notifier module 13 may receive remote notification tasking from tactics 9 running in the computer system 5, interface with a VOIP gateway (not shown) and conduct interactive outbound and inbound VOIP alarm notification. The VOIP notifier module may maintain the VOIP contacts database and gateway configuration. It receives and implements programming from the GUIs. The module may also receive alarm acknowledgment messages via a dual tone keypad input from the responder and relay the messages to the source module 8 for processing in the SCADA system 3.

Figure 2:
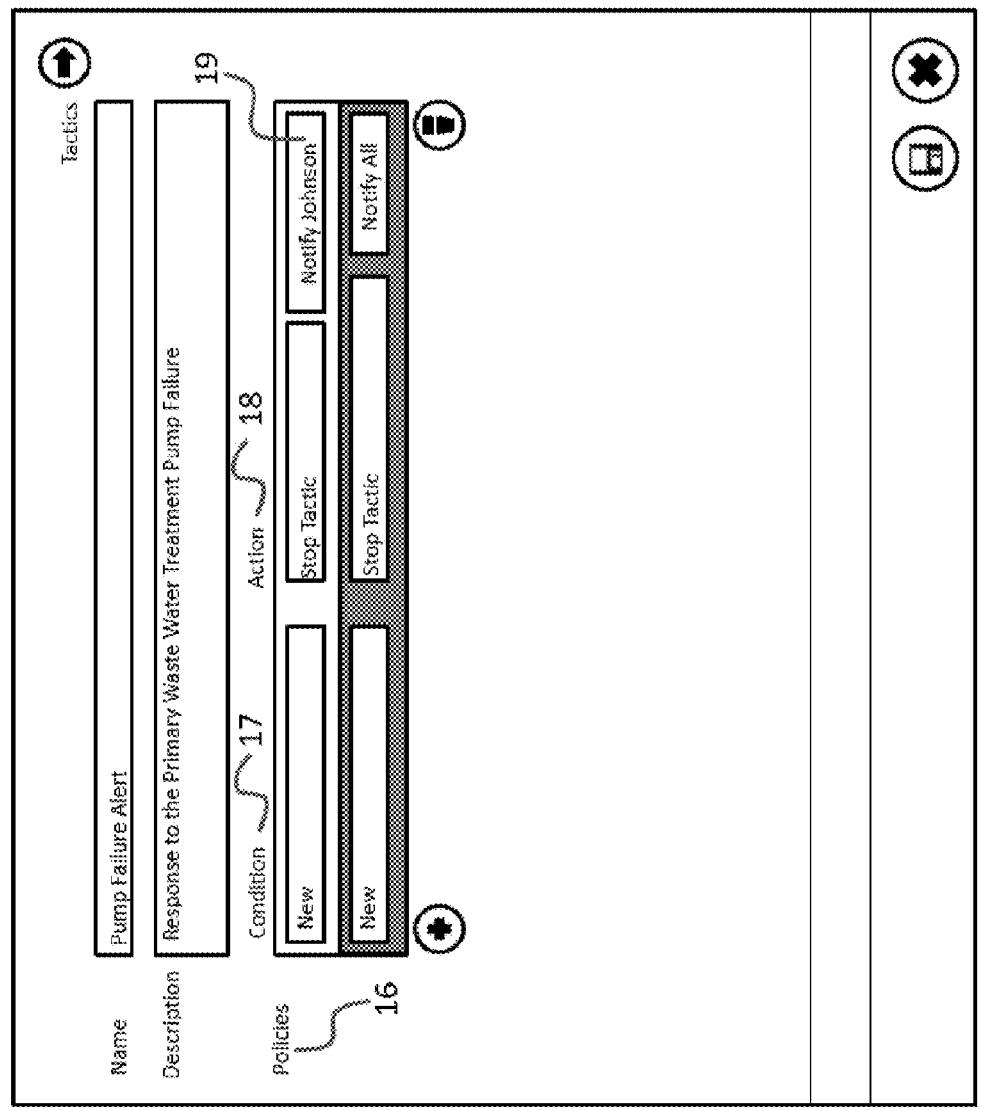
FIG. 2 is a screen shot of a graphical user interface in accordance with the invention showing how a strategy is created.

FIG. 2 is a screen shot of a strategy creation process in accordance with the invention. Based on the conditions of the machinery alarms, a user may configure appropriate responsive strategies, each comprising appropriate tactics. Additional tactics can be called by a strategy depending, for example, on whether the alarm has been acknowledged, the alarm has become inactive, the alarm has recurred, the alarm has been active for a certain amount of time, the alarm state has changed, and/or other conditions. Moreover, multiple tactics can be controlled by the same triggering event. What is also significant about strategies is that whenever a new alarm condition arises, the user can easily program a strategy, for example, to either complete any or all tactics already in progress, or halt any or all tactics already in progress.

Strategies may comprise workflow processes that may comprise any number of lines of "if-then" processes called policies 16. A strategy may comprise a plurality of tactics that implement the strategy. A policy may contain a condition 17 selection that stipulates the type of alarm event, and an action 18 that is to be taken as a result. The action, in most cases may point to a specific tactic 19, such as "Notify Johnson", that will conduct remote notification procedures.

Figure 3:
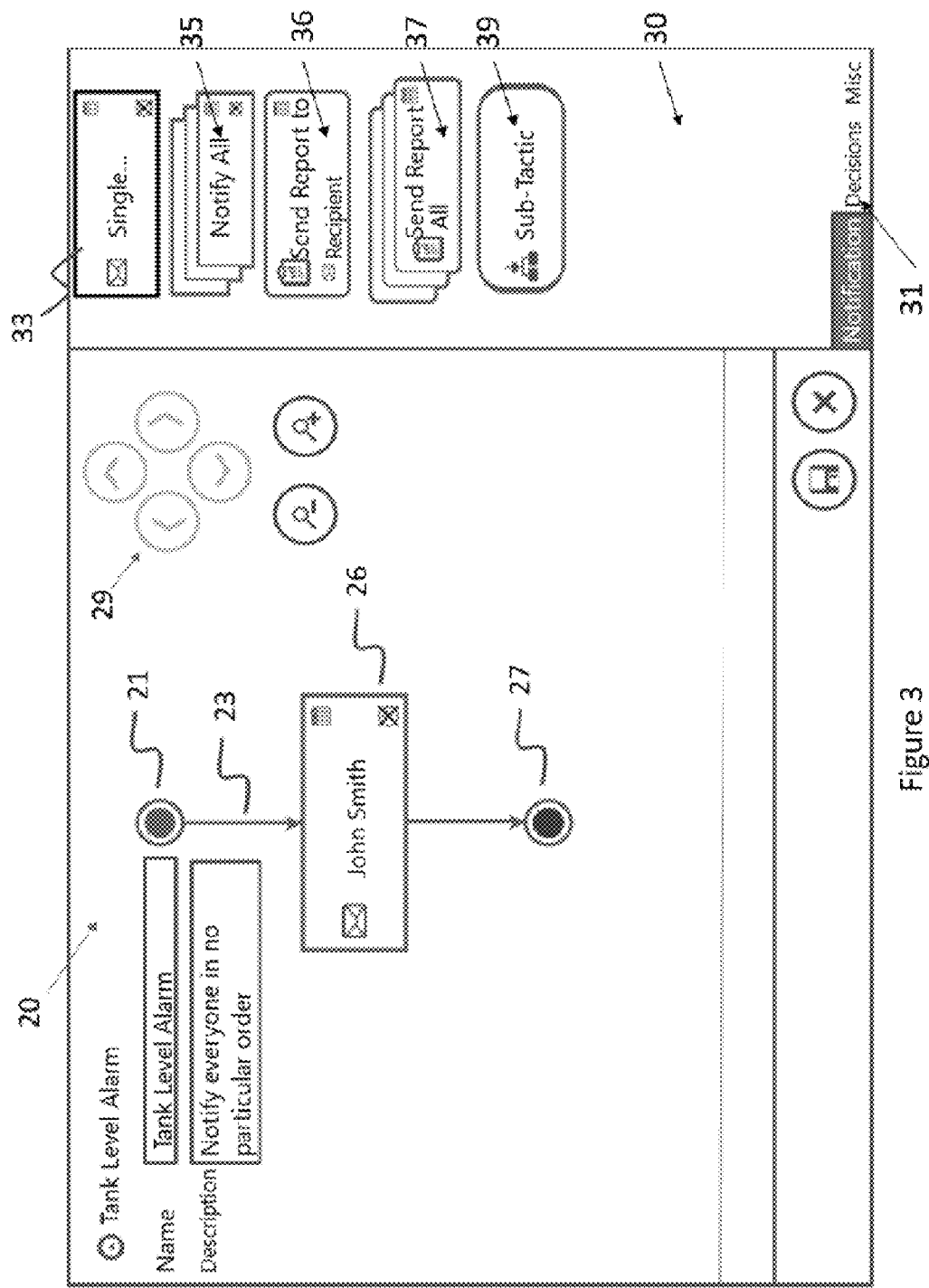
FIG. 3 is a screen shot of a graphical user interface in accordance with the invention showing how a tactic is created, and showing specifically an exemplary subset of instructions called notifications.

FIG. 3 is an example of a screen shot of a tactic creation workspace 20 in accordance with the invention that displays a tactical workflow, or portion thereof, as a flow chart. As shown in the figure, the tactic may comprise elements that include icons that represent a start block 21, an end block 27, and various instruction blocks 25 (which may be chosen from the right panel 30, as will be described) that are connected by logical directional links 23 to form a diagrammatic representation of a logical workflow. The tactic workflow progression begins at the start block 21 and proceeds to the instruction blocks 25 where tasks are executed in sequence and decisions are made as to a next task in the tactic. The tactic is terminated when the progression reaches the end block 27, and a calling strategy may be updated with the results of the tactic. Navigational tools 29 may be provided at the upper right corner of the tactic workspace for zooming in on tactical details or moving the elements or focus using the directional buttons.

A user can drag and drop various icons corresponding to instructions into the tactic workflow from the instruction block selection pane 30 on the right to create the diagrammatic representation of the processing workflow. The instruction block selection pane 31 may include three tabbed subsections entitled Notifications, Decisions, and Misc (i.e., miscellaneous), as shown. Each subsection may display various selectable icons representing instruction blocks that can be dragged onto the workspace and inserted into a tactic workflow. In the example shown, the instruction block subset titled Notifications (on the right hand panel) is selected as indicated by the darkened background. Notifications may include a notification to a single individual 33 (shown as the rectangle marked "Single"), a notification to multiple individuals 35 (shown as the overlapping rectangles marked "Notify All"), a report of data to be sent to a designated recipient 36 (shown as the rectangle marked "Send Report"), a report of data to be sent to a group of people 37 and the initiation of another tactic 39 (shown as the rounded rectangle marked "Sub-Tactic"). Notifications may contain additional parameters, such as who to notify, how the individual should be contacted (e.g., by cell phone voice call, SMS message, smart phone application, email message, etc.) and whether the individual should be contacted only when he/she is on schedule or regardless of that persons schedule. The tactic illustrated in FIG. 3 sends a notification 25 to contact "John Smith".

Figure 4:
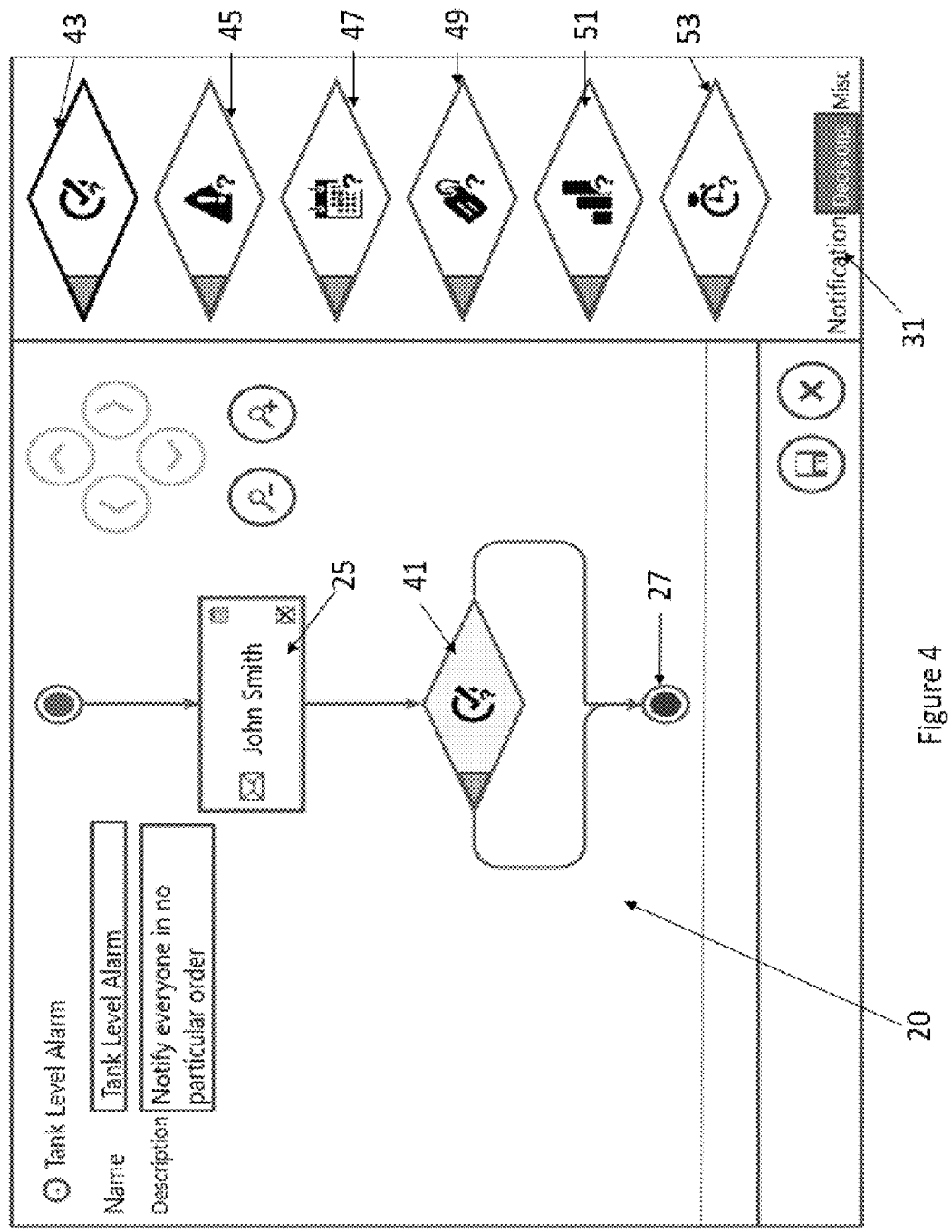
FIG. 4 is a screen shot of a graphical user interface in accordance with the invention showing how a tactic is created, and showing specifically an exemplary subset of instructions called decisions.

FIG. 4 is a screen shot that illustrates an addition to the tactic workflow of FIG. 3 in accordance with the invention. FIG. 4 shows inserting a decision process instruction into the tactic workflow by moving a diamond-shaped decision block 41 into the tactic workflow. This is done by selecting the Decisions tab in the instruction block selection pane 31, as shown in the figure, to display available decision processes. A defining feature of a decision process is that it branches the logic path of the tactic's workflow into two possible directions for further processing, based on whether a predefined parameter is true or false. Available decision processes (blocks 43-53) are shown in panel 30 upon selecting the Decisions tab.

Decisions may include an acknowledgment ("Ack") decision block 43 that branches based on whether or not the current alarm has been acknowledged; an active decision bock 45 that branches based on whether the current alarm is active; a schedule decision block 47 that branches based on whether the time matches certain predefined schedule parameter; a label decision block 49 that branches based on whether or not the alarm belongs to a particular specified machine or other device on which a control sensor is installed; a severity decision block 51 that branches based on the value of the alarm's severity; and a time-span decision block 53 that branches based on whether or not a specified time span has been exceeded. As may be appreciated, other decision blocks may be included.

When one or more decision blocks in the right-hand panel 30 are dragged into the center panel and dropped onto a directional link of the workflow, the tactic workflow is updated to incorporate those decision processes. The tactic workflow diagram is also updated to reflect the decision. A single directional link entering the decision block is branched into two separate links exiting the decision block, both of which converge on an end node 27 (or another instruction block) from opposite directions. If the decision criterion is determined to be false, then the tactical progression follows the link connected to the corner marked "F" for false. Otherwise, the tactical progression follows the other link connected to the unmarked corner of decision block 41 which represents true. If the alarm condition has been acknowledged by the previous "John Smith" notification block, then the tactical progression will follow the path indicating a true condition and may end the tactic at end node 27. If the alarm event has not been acknowledged then the progression will follow the link which is attached to the corner marked "F". As may be appreciated, other instruction blocks may inserted into one or both of the links from the opposite sides of decision block 41 to take appropriate actions based upon the decision. This is illustrated in the next FIG. 5.

Figure 5:
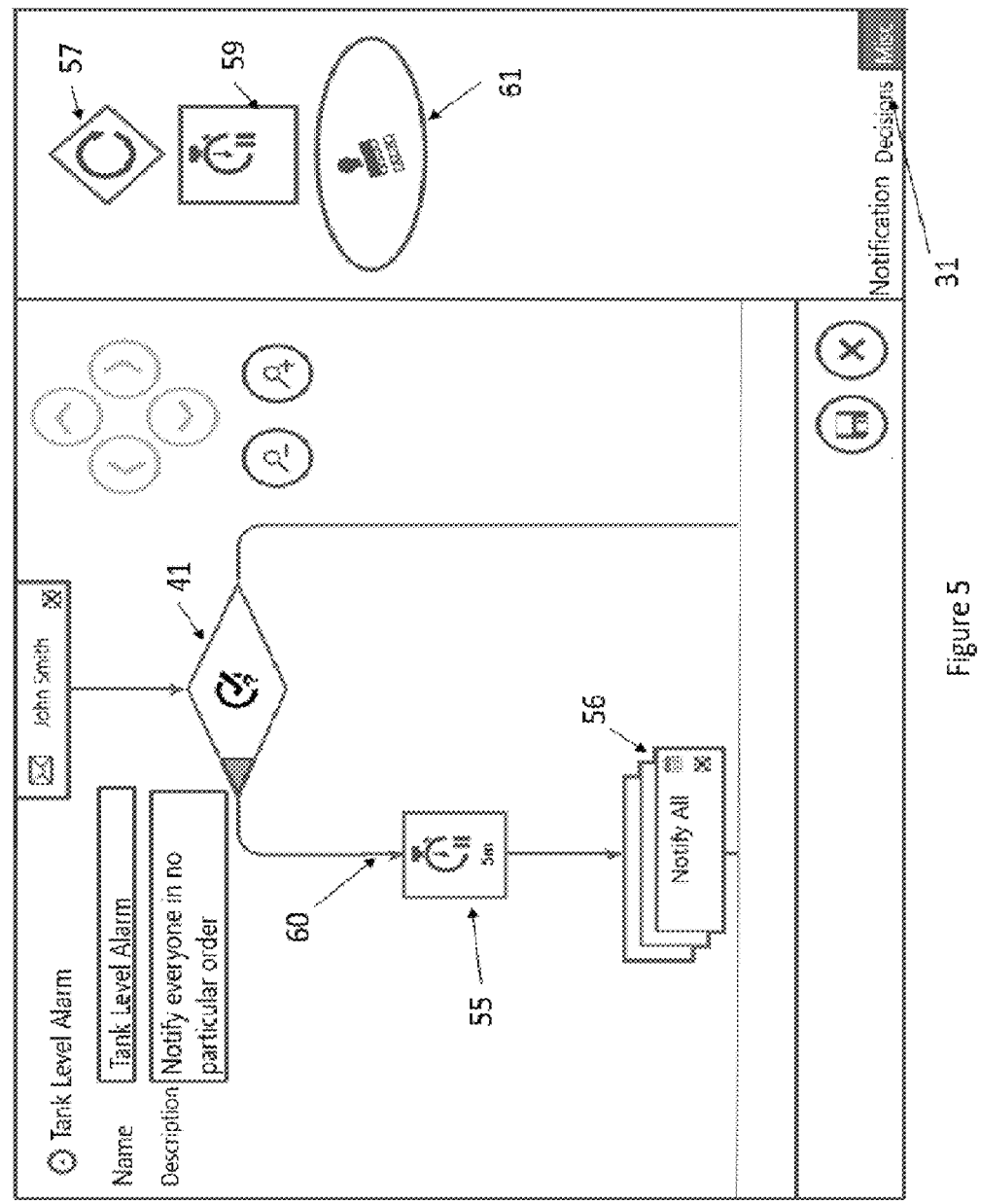
FIG. 5 is a screen shot of a graphical user interface in accordance with the invention showing how a tactic is created, and showing specifically an exemplary subset of instructions called miscellaneous processes.

FIG. 5 is another screen shot showing further additions to the tactic workflow of FIGS. 3 and 4 in accordance with the invention. FIG. 5 shows the insertion of a miscellaneous instruction process block 55 into the tactic workflow. In this case the miscellaneous instruction process comprises a delay (or wait) step, and is accomplished by moving a delay block 59 from panel 30 into the tactic workflow at the desired location. In addition a "Notify All" instruction 56 has been inserted into the link following the delay 55, which may be done as previously described in connection with FIG. 3. Insertion of delay 55 is accomplished by selecting the Misc tab in the instruction block selection pane 31, as shown in FIG. 5, dragging and dropping the delay block 59 into the link 60 of the workflow to implement the desired logic, and setting a user-selected delay time, e.g., 5 minutes ("5 m") as shown in FIG. 5. As implied by the name, the miscellaneous instruction blocks comprise instructions that affect the tactical progression in various ways that do not fit neatly into the previous classifications. As shown, miscellaneous instruction blocks may include, for example, a diamond-shaped loop block 57 which repeats (loops) a set of instructions for a specified number of times before exiting the loop and proceeding to the next instruction; delay block 55 which causes the tactical workflow progression to delay a user-specified amount of time before proceeding to the next instruction; and an acknowledgement (Ack) elliptical-shaped block 61, whereby the system performs an acknowledgement on behalf of a designated individual. In the example shown in the figure, delay instruction block 55 having a user-selected delay of 5 minutes was introduced into the tactical progression on the link 60 from the false side of decision block 41. If the alarm event is not acknowledged upon its occurrence by John Smith, then the tactic will pause for the designated period of time, e.g., 5 minutes (or other amount of time as set by the user), to await an acknowledgment before executing a Notify All broadcast task 56. As will be appreciated, other types of notifications, decisions and miscellaneous instructions may be inserted into the workflow to implement the desired tactical logic. Once a workflow diagram has been created, it may be converted by the computer system into computer code corresponding to the tactic workflow (or a portion thereof), may be stored in the data store of the computer system, and called as needed. This may be accomplished by associating a set of executable instructions with each icon, and, upon saving the workflow, assembling the sets of executable instructions into a sequence of executable instructions that control the computer to execute the tactic. Tactic workflows may also be recalled for editing or for creating other workflows using the GUIs.

Figure 6:
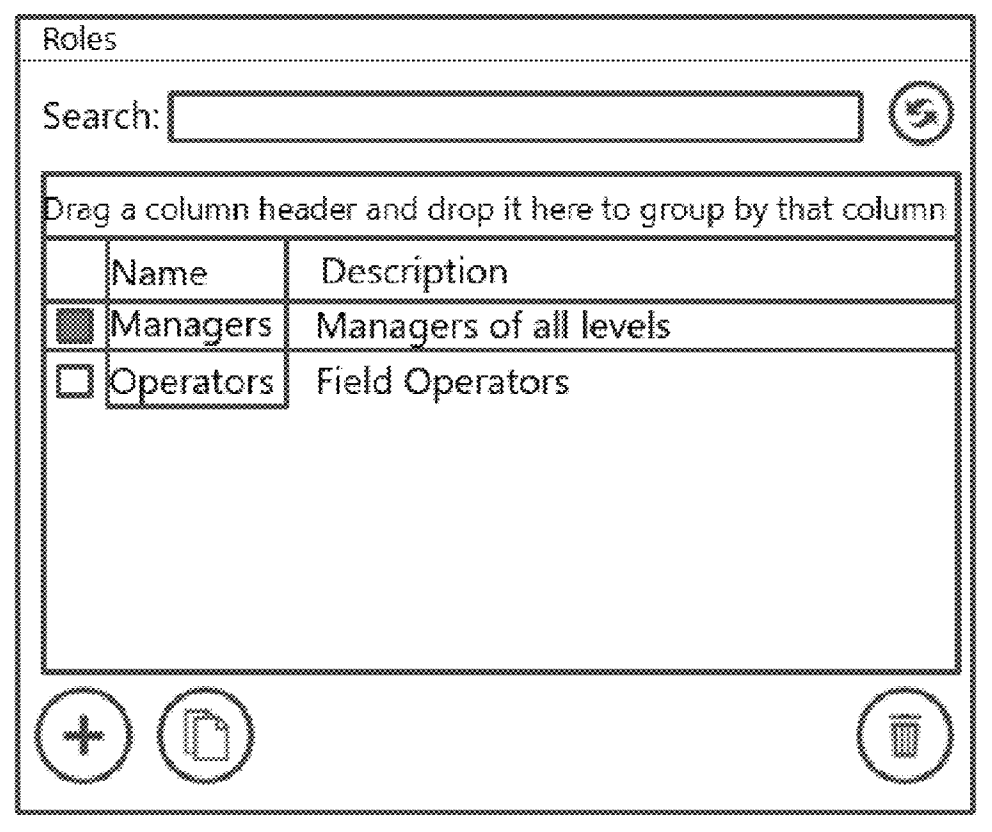

FIG. 6 is an example of a screen shot showing the concept of roles in accordance with the invention. Individuals may be designated as having one or more roles, e.g., "machine operators", "managers", etc. There is no limit to the number and types of roles that a user can create and modify. Roles are important in an alarm framework because often there is a reason to notify different personnel for different types of events and reasons. Operators may be notified first, for example, and then if operators do not address the alarm, others such as managers may be notified. The invention makes it easy for personnel to change roles as, for example, when an operator is promoted to a manager, without requiring major modification or reconstruction of tactical process workflows. Rather than having to undertake a tedious process of changing all tactics to take into account new notification rules for a new or newly-promoted individual, the user needs only to change an individual from one role to another, e.g., from an operator to a manager, to have the change applied to all tactics involving that role without changing the logic of the workflow. This saves significant time, tedium, and avoids the risk of inaccuracies being introduced into the alarm system. Roles are attributes of users that have names based upon different functions or responsibilities, and may be color-coded on the GUIs for easy identification. Roles may be assigned to users and workflows may be constructed that determine when one or more particular individuals should be notified based on their role upon an alarm event. In FIG. 6, different roles may be created and selected for notification, and individuals may be assigned to the different roles.

Figure 7:
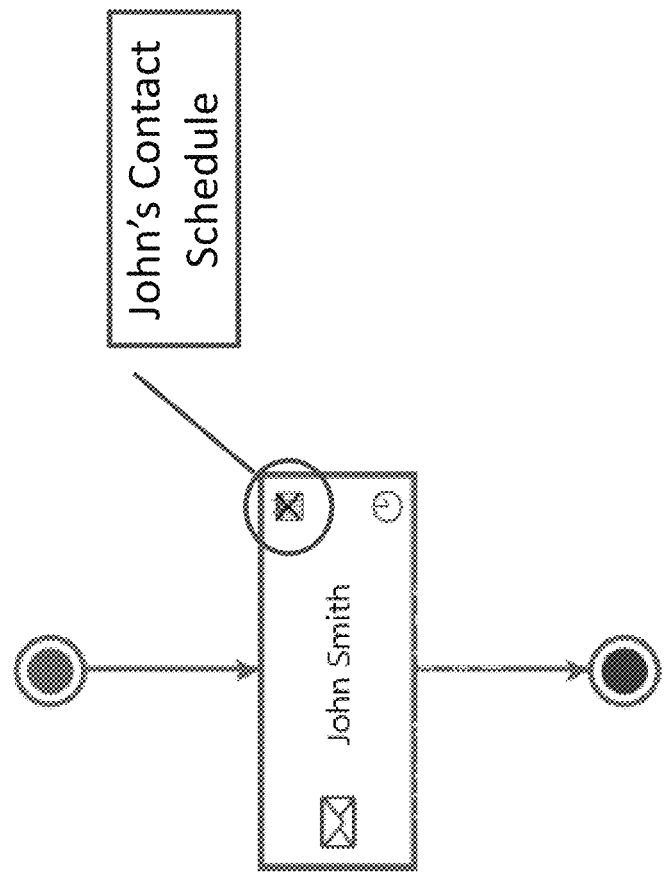
FIG. 7 is a screen shot showing how each notification individual's flow box is tied to the individual's schedule in accordance with the invention.

FIG. 7 is an example of a screen shot of an example of a notification instruction block (for John Smith) which illustrates that each individual notification instruction block may have a schedule icon that, upon selection, indicates parameters that may be selected and set to determine operating conditions for the instruction. These may include, for example, when and for which types of events an individual should be contacted. In this way the invention system knows the appropriate person to notify, based on his or her schedule or other parameters. The system may also notify someone in a way that is based on whether that particular individual is appropriate for the time of day or the type of event. For example, the system may notify person "A" on his work phone if he is "on schedule", and on his home phone if he is not.

Figure 8:
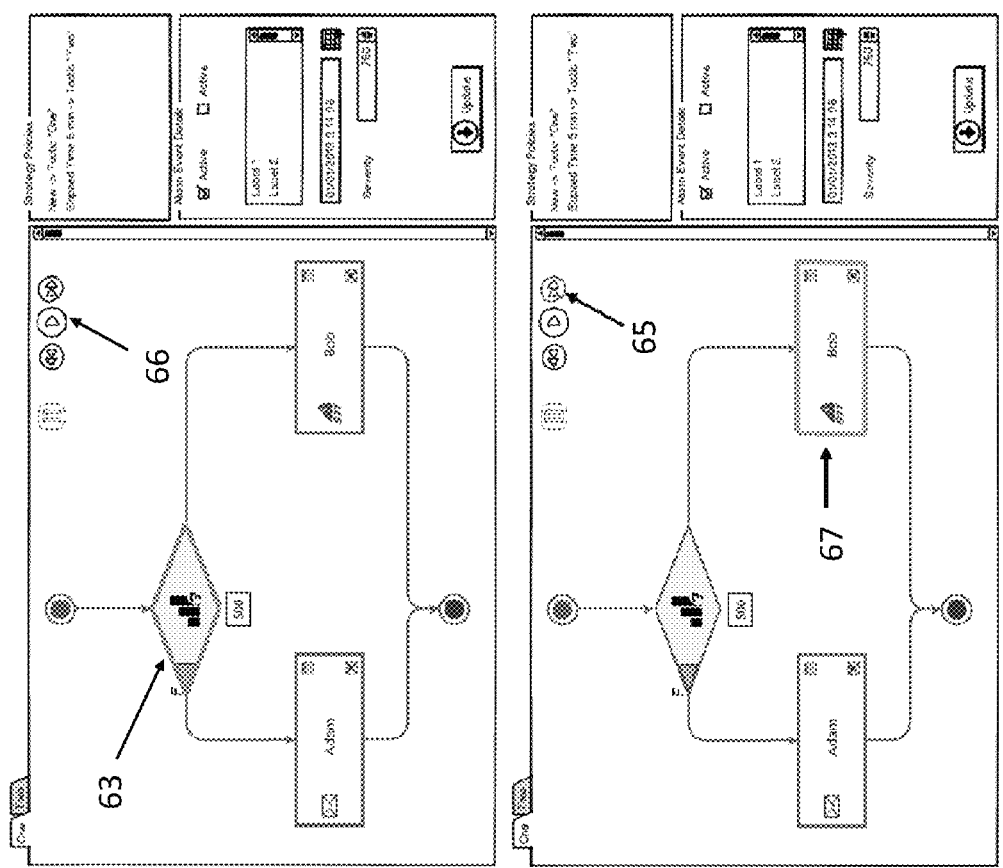
FIG. 8 is a screen shot showing how a user can trace tactic and strategies in accordance with the invention.

FIG. 8 shows an example of a strategy/tactic trace workspace in accordance with the invention that allows an end user to interactively test the tactical progression of the tactic the user is developing by stepping through the logic of the instructions that are executed by the tactic. By specifying initial conditions and allowing the user to change certain values of a simulated alarm event, as well as the workflow, the user interface of FIG. 8 provides a visualization of a strategy's execution. For running tactics, the tactic workflow diagram may be traced along a path of execution to highlight the next instruction for execution in the workflow. A set of playback control buttons 66, comprising, for example, pause, play, step forward, step backward, etc., allow the user to simulate a scenario (i.e., a particular sequence of alarm events) and step through the workflow to ensure that the strategy(ies)/tactic(s) behave as expected. This is a useful and significant tool that enables the user visualize how the remote alarm notification will behave under different scenarios, and to readily spot and correct any errors. In the example depicted in FIG. 8, the top frame shows an initial instruction block 63 that is executed upon the first alarm event. Upon clicking a step forward button 65, the tactic workflow process is advanced to the next step of the workflow scenario. In the case shown, the severity instruction block 63 evaluated the severity of an alarm to be greater than a preset value of 500 (as indicated below the instruction block 63). Therefore, the right link from block 63 will be taken to advance the tactical progression to "Bob's" notification block 67. This visualization tool is very useful for developing, testing and evaluating the alarm notification system in a manner that is far easier than current methods.

Figure 9:
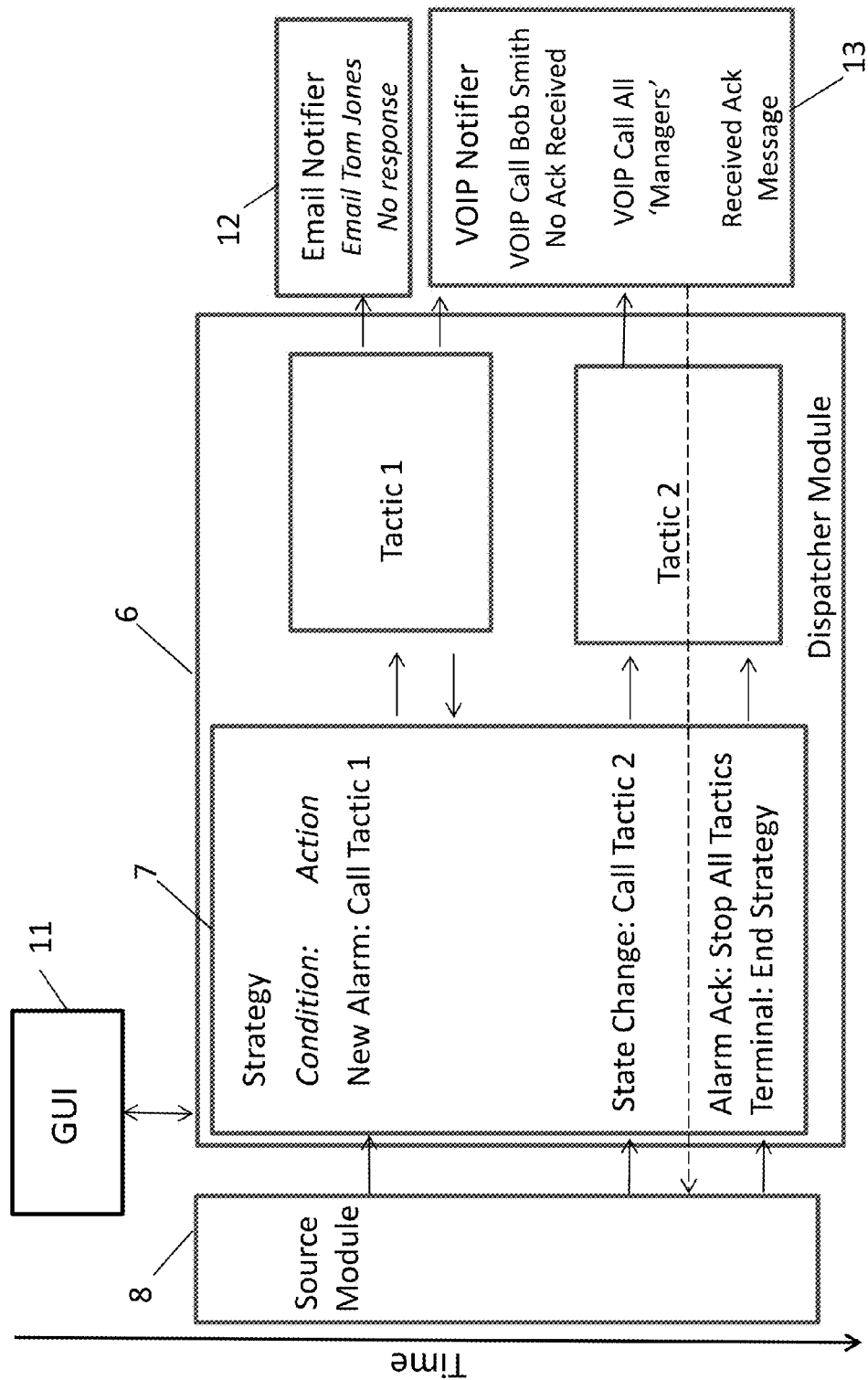
FIG. 9 is a conceptual drawing depicting a hypothetical remote notification scenario.

FIG. 9 shows an example of a hypothetical time-based series of events that demonstrates the interaction of various modules during runtime. This figure highlights how strategies and tactics may share information in order to execute remote notification rules during the occurrence of an alarm event.

The scenario may begin when a user assigns an alarm event to a strategy being developed by using a GUI 11. Sometime later after the configuration goes live, the source module 8 may deliver a new alarm event message that it received from the SCADA system 3 and route it to an associated strategy process 7 within the dispatcher module 6.

The strategy process 7 processes the new alarm event condition according to its policy and may call "Tactic 1".

Tactic 1 may immediately instruct the email notifier 12 to send an alarm message to a pre-designated alarm responder, e.g., Tom Jones, after waiting the predetermined amount of time for a response from Tom to the initial alarm event.

After the predetermined amount of time expires, Tactic 1 may then instruct the VOIP notifier 13 to call Bob Smith, deliver the alarm event message verbally, and process Bob's response, if any. If in the scenario Bob declines to Ack the alarm, Tactic 1 may inform the strategy process 7 and terminate or branch to a different tactic.

Sometime later the source module 8 may receive an updated message from the SCADA system that the alarm event was escalated to a higher level, and route the update to the strategy process 7. The escalation event may cause a state change and the stategy's state change policy may call Tactic 2.

Tactic 2 may, for example, immediately instruct the VOIP notifier 13 to broadcast a simultaneous callout out to all VOIP contacts that are designated as having a certain role, e.g., a manager role. One of them may respond with an acknowledgement code that the VOIP notifier relays to the source module which subsequently delivers it to the SCADA system.

The SCADA system may accept the acknowledgement and inform the source module. In response, the source module may route an acknowledgement confirmation to the strategy process which may stop all tactics in progress in accordance with its alarm acknowledge policy, and terminate the strategy.

Configuring and Applying Strategies and Tactics

Preliminary data may be entered by launching an internet browser and entering the URL of a particular machine of interest, e.g., https://MachineName/WIN911/. From here, the user may navigate to other GUIs using the navigation links located at the top of the page.

Before strategies and tactics can be configured, the user must gather and enter all data that will be utilized by the strategies and tactics for input into the workspace. The preliminary data may fall into two categories: 1) alarm event data source, such as tagnames and descriptions of alarm events, and 2) contact information for locating and notifying alarm responders. This information may include email addresses, phone numbers, and duty schedules and roles. The pages that configure this data may be stored in the database of the computer system 5 and accessed via the navigation links to alarm events and contacts. Details of preliminary data entry will be omitted for the remainder of this discussion in order to focus on the development of strategies and tactics.

Development of Tactics

Tactics may be designed by using the navigation links in the GUIs indicating notification/tactics. Clicking a create icon at the bottom right of the tactics list may bring up a blank tactic workspace in an edit mode. A unique name for the tactic may be entered in a "Name" field, such as "Pump Failure Alert" as shown FIG. 2, and a brief description of the tactic entered in a "Description" field as shown. A blank tactic may be represented by a color coded, e.g., green, circular start node, where the tactic begins, and a red end node where the tactic concludes. Connecting directional link lines between the blocks and nodes represent the workflow of the tactic.

Tactical instruction blocks may be dragged and dropped from the right hand pane directly into the tactic design workspace, as previously described. Blocks may be chosen from the three categories: notifications, decisions, and miscellaneous (as detailed above). A block corresponding to a desired instruction may be dropped into a link in a place in the workflow where it is to execute.

For example, if one wants a tactic to pause for a predetermined time, e.g., 5 minutes, before taking action, he may click on the miscellaneous ("Misc") tab at the bottom right of the instruction block pane. This may bring up the Misc instruction block section, allowing a delay block (59) to be dragged to the middle of the tactic and dropped between the start node and the end node. The tactical display will adjust to show the new block, and incorporate the corresponding delay functionality into the tactic workflow. The delay time may be set for to a desired period of time, such as 5 minutes, as by clicking the block and selecting an edit icon in the center of an edit form that appears. Selecting a minutes unit and clicking an up arrow five times increments the display and sets the timer.

A tactic may evaluate the acknowledgement condition of an alarm event by the insertion of an Ack decision block into the workflow. Clicking the decision tab at the bottom of the instruction bock pane can display the desired section and available instructions. Clicking the Ack decision block and dragging and dropping it into the tactic directly on a flow line beneath the delay block inserts the desired functionality. The tactic workflow display will adjust to incorporate the delay into the workflow, and branch out the tactical path into two separate routes. One route will branch off to the left representing the path to be taking if the condition (acknowledgement) is false ("F"). The other right (unlabeled) path may to be taken if the condition is true. Both routes may terminate in further instruction blocks or an end node. Upon saving a tactic workflow, computer instructions implementing the workflow are saved in the database.

A tactic may invoke remote notification procedures when arriving at a notification block. These may be selected from the notification instruction blocks section. A single person (or a group of people) can be notified using a single notification instruction block, depending on the particular block selected. For example, a notify single that is dropped in a path which will instruct the tactic to notify the designated contact. After the block is dropped into the path the user may click the block and select edit to designate the particular named contact to be notified. The contact selector may poll the email and VOIP notifiers for their respective lists of contacts, and display them in a scrollable selection list. Each contact may have an associated duty schedule that determines when that person is on duty and available for notification, and may have other parameters that indicate other conditions that apply to notifications of that contact. The notify block may have the option to ignore the schedule and notify a particular person regardless of his schedule. By clicking a checkbox to the left of a contact's name and a checkbox below the selection list titled "Ignore Duty Schedule", the notification block will ignore that individual's schedule, and insert those conditions into the tactic to complete it. Upon clicking a save icon at the bottom right of the workspace GUI, the tactic will be saved and will appear in the tactics list box, and be available for selection in the strategies workspace.

Development of Strategies

Any number of strategies based the preliminary data entry and desired notification rules may be created and stored in the database for use as desired. Each strategy will preferably have a unique user-defined name and may optionally contain a description to elaborate on the function of the strategy, as previously described. Policies may be designated to define the behavior of a strategy. A strategy will manage the remote notification procedures by controlling its tactics based on the events that occur in the life cycle of the alarm. Typically, the strategy will begin with a triggering event (or condition) like a new alarm, which will call an initial tactic (action). Each strategy may have an unlimited number of interior policies that modify the notification rules as required by subsequent events such as state changes and elapsed time. Lastly, each strategy may have a terminating condition that will end the strategy based on the end of the alarms life cycle.

The user may create new strategy by selecting an initial policy that begins execution when a new alarm event occurs. The policy condition may be selected from the pull-down list by clicking the down arrow and highlighting "New Alarm". The action that the initial policy takes may be to start Tactic 1 by clicking the down arrow in the pull-down list and highlighting the "StartTactic" action. This will bring up and extra input button that the user clicks to select the desired tactic.

The strategy may be terminated when the alarm event is both acknowledged and the value of the data returns to its normal range. Thus, a second policy may be added with the condition "terminal" and the action "end strategy" selected. When the strategy is saved, in a database for example, it becomes available for use in an alarms workspace where a particular alarm event can be assigned to the strategy.

Testing a Strategy and Tactic

In order to test the performance of a strategy and/or tactic, a system and method in accordance with the invention provide a playback system that simulates runtime execution based on the logic configured in the workflow and simulated alarm events that a tester (user) can manipulate. The simulation input may be located in the right pane and the logic flow may be observed by clicking the playback buttons in the upper right of the display. The tactical progression may be represented when links and instruction blocks are highlighted. If a test arrives at an Ack decision block, a true may be entered into the alarm event details pane and the update button clicked. The next time the play button is clicked the tactical progression will advance down the true path to the next instruction block. When the tactical progression reaches the end node, the simulation is over. The testing user may then replay the tactic to evaluate other possible scenarios based on alarm event inputs to ensure the tactics perform the remote notification rules as desired.

After a strategy and its tactics are developed and tested, they can be saved and utilized by the runtime modules when the strategy is assigned to an alarm event. This may be done by clicking the navigation links alarming/source/alarms and then selecting the desired item. Next, an edit icon may be clicked, followed by the alarms tab. A strategy pull-down selector will be enabled and the user can click the down arrow and highlight the desired strategy. Once this is done and the save icon is clicked, the strategy and its associated tactics will be converted to executable code and written as a workflow to the dispatcher module. It will execute the next time the alarm event occurs.

When an existing strategy or tactic is edited, the modification may be written to the dispatcher module when the save icon is clicked. If a strategy undergoing modification is in progress when the save icon is clicked, the strategy is preferably allowed to conclude before the modification is applied. Tactics may be handled in similar fashion. If a tactic undergoing modification is in-progress when the save icon is clicked, the tactic may be allowed to conclude before the modification is applied. A tactic can be modified during the execution of its associated strategy so long as that tactic is not in progress when the save icon is clicked. If it is then the modification of the tactic will be applied at its conclusion, which is transparent to the user.

While the foregoing has been with respect to preferred embodiments of the invention, it will be appreciated that changes to these embodiments can be made without departing from the principles and spirit of the invention, the scope of which is defined by the appended claims.

The invention claimed is:

1. A computer implemented method for constructing strategy and tactic workflows for notifications of alarm events occurring in automated machinery, comprising:
   providing a graphical user interface (GUI) on a computer system, the GUI displaying a workspace and a plurality of display panels that are selectively displayable adjacent to said workspace, each said panel displaying a plurality of instruction block icons representing different types of instructions for controlling different processing operations of said computer system;
   positioning selected ones of said instruction block icons from said panels into said workspace to create a diagrammatic representation of a logical workflow of operations for processing notifications concerning a predetermined alarm event; and
   converting by said computer system said diagrammatic representation of said logical workflow of operations in accordance with the positions of said instruction block icons in said workspace into a sequence of computer executable instructions for controlling said computer system to process said notifications concerning said predetermined alarm event in accordance with said logical workflow.

2. The method of claim 1 further comprising storing said sequence of computer executable instructions in a data store, and calling said sequence of instructions from said data store upon the occurrence of said predetermined alarm event to control the computer system to process said predetermined alarm event and said notifications.

3. The method of claim 1, wherein said operations comprise notification instructions for notifying selected personnel in response to the predetermined alarm event, decision instructions for varying the processing operations of said workflow according to results of decisions made based upon conditions associated with said predetermined alarm event, and miscellaneous instructions for modifying said workflow in accordance with an associated strategy.

4. The method of claim 3, wherein said notification instructions comprise instructions for providing other notifications based upon conditions associated with said alarm event or upon said selected personnel not responding to said notifying in accordance with preset parameters.

5. The method of claim 4, wherein said instructions for providing other notifications comprise instructions for notifying designated personnel based upon personnel schedule or role type.

6. The method of claim 3, wherein said providing notifications comprise providing one or both of email and voice notifications.

7. The method of claim 3, wherein said conditions associated with said alarm event comprise one or more of a severity of said alarm event or a failure of said selected personnel to respond to a notification within a predetermined period of time.

8. The method of claim 1 wherein one or more of said icons enable selecting operating conditions for controlling a corresponding processing operation represented by said one or more icons.

9. The method of claim 1, wherein said workflow comprises one or more tactics, each tactic comprising a logical sequence of processing operations, and said method comprises constructing said one or more tactic workflows for each one of different strategies for processing alarm events.

10. A system for constructing strategy and tactic workflows for notifications of alarm events occurring in automated machinery, comprising:

a computer system having a display providing a graphical user interface (GUI) displaying a workspace; the GUI having a plurality of panels that are selectively displayable adjacent to said workspace, each said panel displaying a plurality of instruction block icons representing different types of instructions for controlling different processing operations of said computer system; and a control mechanism for positioning selected ones of said instruction icons from said panels into said workspace to create a diagrammatic representation of a logical workflow of operations for processing a predetermined alarm event; the computer system converting said diagrammatic representation of said logical workflow of operations in accordance with the positions of said instruction icons in said workspace into a sequence of computer executable instructions for controlling said computer system to process said predetermined alarm event in accordance with said logical workflow.

11. The system of claim 10 further comprising a data store for storing said sequence of executable instructions and for controlling said computer system to communicate notifications upon the occurrence of said predetermined alarm event.

12. The system of claim 11 further comprising notification modules for notifying said pre-selected personnel in accordance with said workflow upon the occurrence of an alarm event.

13. The system of claim 12, wherein said notification modules comprise an email module for providing email notifications and a voice module for providing verbal notifications, said email module and said voice module each having stored contact information for said pre-selected personnel.

14. The computer system of claim 10, wherein said operations comprise notification instructions for notifying predetermined personnel in response to the predetermined alarm event, decision instructions for varying the processing operations of said workflow according to results of decisions made based upon conditions associated with said predetermined alarm event, and miscellaneous instructions for modifying said workflow in accordance with an associated strategy.

15. The system of claim 14, wherein said notification instructions comprise instructions for providing other notifications based upon conditions associated with an alarm event or upon said selected personnel not responding to a notification in accordance with preset parameters.

16. The system of claim 15, wherein said instructions for providing other notifications comprise instructions for notifying designated personnel based upon personnel schedule and/or role type.

17. The system of claim 15, wherein said conditions associated with said alarm event comprise one or more of severity of said alarm event or failure of said selected personnel to respond within a predetermined period of time.

18. The system of claim 10, wherein said one or more of said icons have associated therewith settable conditions for controlling a corresponding processing operation represented by said one or more icons.

19. The system of claim 10, wherein said workflow comprises one or more tactics, each tactic comprising a logical sequence of processing operations, and wherein there are different strategies, each strategy having said one or more tactics for processing alarm events.

* * * * *